United States Patent
Guise et al.

(10) Patent No.: US 10,572,695 B1
(45) Date of Patent: Feb. 25, 2020

(54) TOUCH SCREEN FILM LAYER HAVING TAMPER LINE EMBEDDED THEREIN

(71) Applicant: Square, Inc, San Francisco, CA (US)

(72) Inventors: Max Guise, San Francisco, CA (US); Isreal Blagdan, Oakland, CA (US); Bradley T Hall, San Francisco, CA (US); Trent Weber, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 362 days.

(21) Appl. No.: 15/428,071

(22) Filed: Feb. 8, 2017

Related U.S. Application Data

(63) Continuation of application No. 14/869,526, filed on Sep. 29, 2015.

(60) Provisional application No. 62/214,639, filed on Sep. 4, 2015.

(51) Int. Cl.
   *G06Q 20/00* (2012.01)
   *H04L 29/06* (2006.01)
   *G06F 21/86* (2013.01)
   *G07G 1/12* (2006.01)

(52) U.S. Cl.
   CPC ............... *G06F 21/86* (2013.01); *G07G 1/12* (2013.01)

(58) Field of Classification Search
   None
   See application file for complete search history.

(56) References Cited

U.S. PATENT DOCUMENTS

| | | | |
|---|---|---|---|
| 2013/0300453 A1* | 11/2013 | Carapelli | H03K 19/003 326/8 |
| 2014/0150056 A1 | 5/2014 | Williams et al. | |
| 2014/0208786 A1* | 7/2014 | Billman | A23G 9/28 62/136 |
| 2014/0375481 A1 | 12/2014 | McNicoll | |
| 2015/0077361 A1* | 3/2015 | Seo | B60R 1/088 345/173 |
| 2017/0323537 A1* | 11/2017 | Lim | G08B 13/20 |

OTHER PUBLICATIONS

International Search Report and Written Opinion for International Application No. PCT/US2016/050036, dated Nov. 29, 2016.

* cited by examiner

*Primary Examiner* — Ariel J Yu
(74) *Attorney, Agent, or Firm* — Maynard Cooper & Gale, P.C.; Jon E. Holland, Esq.

(57) ABSTRACT

A tamper-proof computing device used in conducting a point-of-sale transaction. The tamper-proof computing device comprises a touch-screen display. In some embodiments, an ITO layer is deposited on the touch-screen display that has a tamper line embedded in the ITO layer, such that the tamper line is susceptible to breaking upon unauthorized physical manipulation, and the tamper line is in communication with a microcontroller that is configured to detect the tamper, and to render the tamper-proof computing device inoperable. The tamper line can be a single line trace embedded in the ITO layer or a cluster of traces embedded in the ITO layer. A method of manufacturing comprises forming a tamper line in an ITO layer, depositing the ITO layer on the display and coupling the tamper line to a security microcontroller.

20 Claims, 9 Drawing Sheets

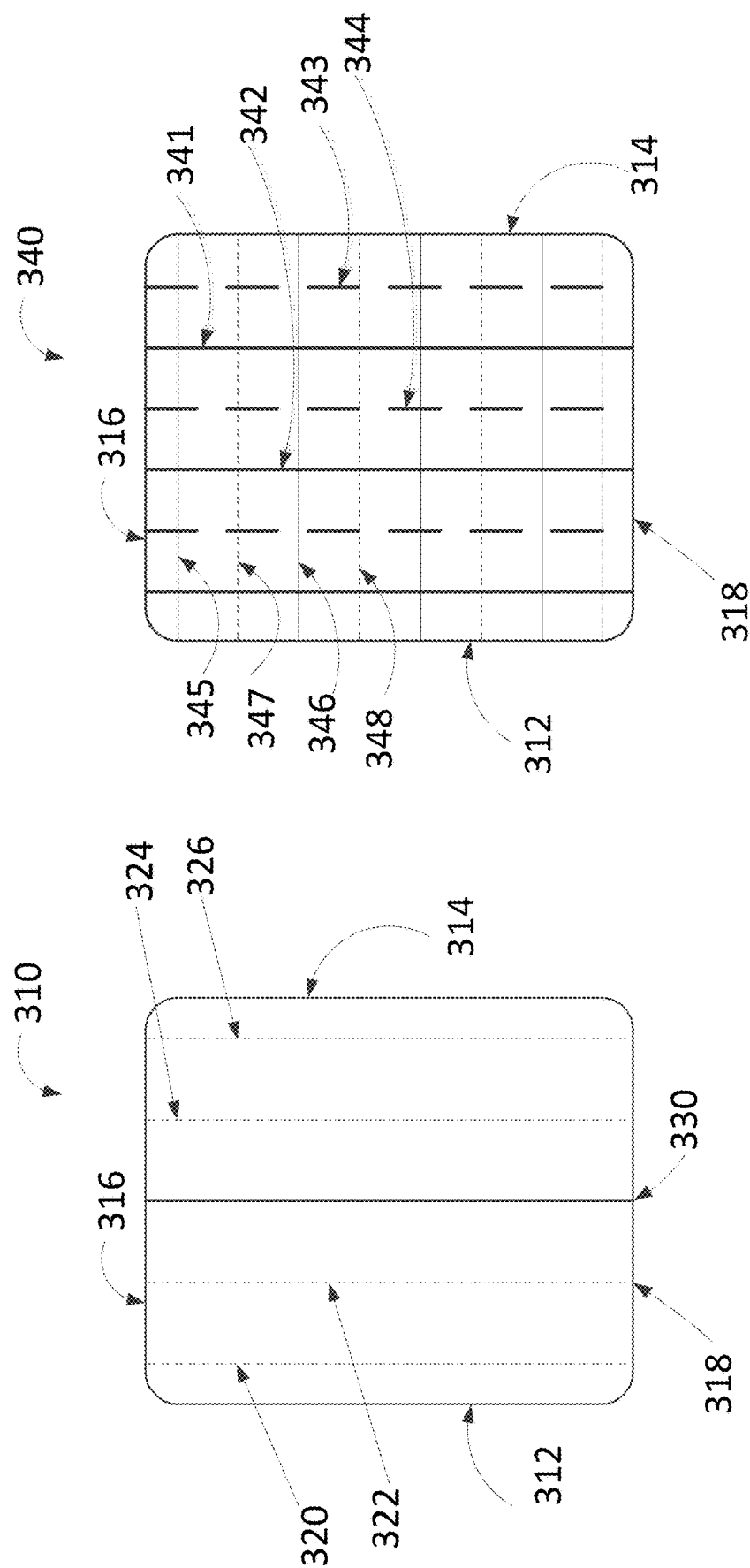

TOUCH SCREEN FILM LAYER HAVING TAMPER LINE EMBEDDED THEREIN

CROSS-REFERENCE TO RELATED APPLICATIONS

This application is a continuation of U.S. application Ser. No. 14/896,526, filed on Sep. 29, 2015, entitled "TOUCH SCREEN FILM LAYER HAVING TAMPER LINE EMBEDDED THEREIN," which claims the benefit of U.S. Provisional Patent Application No. 62/214,639, entitled "TOUCH SCREEN FILM LAYER HAVING TAMPER LINE EMBEDDED THEREIN", filed on Sep. 4, 2015, both of which are incorporated herein by reference in their entirety.

BACKGROUND

Consumers can interact with merchants to conduct various financial payment transactions. For example, a consumer can conduct a transaction with a merchant at a point-of-sale system using cash, a transaction card, or other transaction object. Oftentimes the computing devices used in various point-of-sale systems are susceptible to tampering and other fraudulent manipulation.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3A illustrates an example diagram of a tamper-proof computing device having a tamper line proximate the ITO layer.

FIG. 3B illustrates an example diagram of a tamper-proof computing device having a mesh of tamper line traces proximate the ITO layer.

DETAILED DESCRIPTION

System, devices, methods, and non-transitory computer-readable media are disclosed in accordance with various embodiments of the present disclosure overcome one or more of the above-referenced and other deficiencies in conventional approaches to point of sale systems. In particular, in accordance with various embodiments, approaches provide for a payment object reader that is used in performing a payment transaction at a point-of-sale system.

A computing device used in conducting point-of-sale transactions oftentimes is susceptible to tampering in order for internal components of the device to be fraudulently accessed. In some embodiments, the tamper-proof computing device uses a tamper line that can detect an unauthorized physical manipulation of the computing device, such as removal of a touch-screen or another unauthorized manipulation of the computing device.

Where a tamper line is used to tamper-proof the computing device, the tamper line can be embedded in, or deposited on, an ITO layer of the tamper-proof computing device. The tamper line is coupled to a microcontroller and the tamper line is susceptible to breaking upon an unauthorized physical manipulation of one of the ITO layer or the display. The microcontroller is configured to render the tamper-proof computing device, or at least some components thereof, inoperable upon detecting the unauthorized physical manipulation. In some embodiments, the tamper line can be embedded into an ITO layer prior to being deposited on a touch-screen display.

Other advantages, variations, and functions are described and suggested below as can be provided in accordance with the various embodiments.

Figure 1:
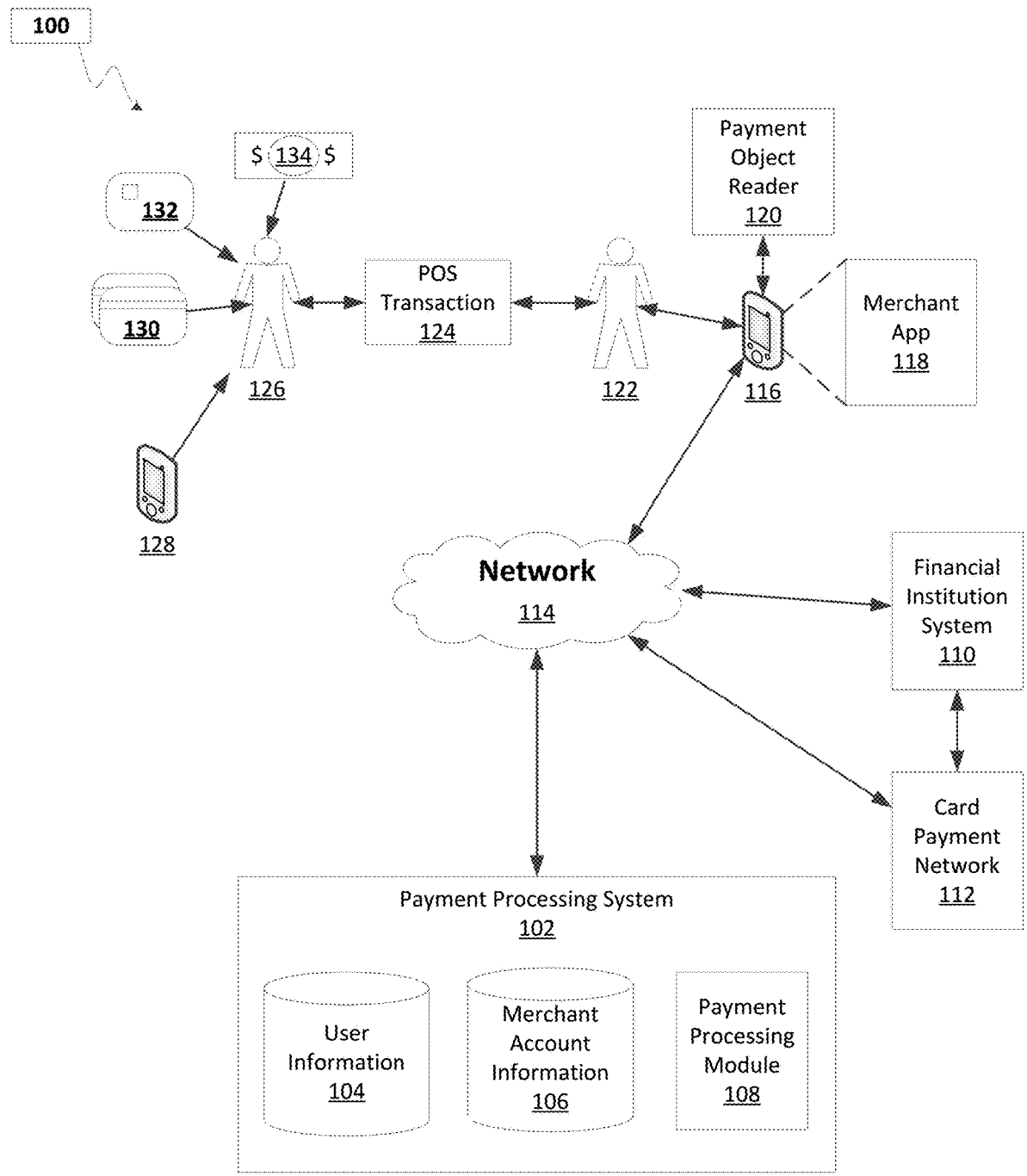
FIG. 1 illustrates an example architecture of a payment communication system for enabling transactions between merchants and buyers.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (for example, EMV payment objects), a radio frequency identification tag (for example, near field communication (NFC) enabled objects), and the like. In some embodiments, the user 126 can use the user device 128 to conduct NFC payment transactions through communication between the user device 128 and the payment object reader/transmitter device 120, for example.

The payment communication system 100 in the example of FIG. 1 illustrates a merchant device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, and so forth.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the merchant device 116. The payment object reader can also read data from an NFC device and communicate the data to the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment processing system is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., Visa or MasterCard, etc., over the network, or over a different network, for example, to conduct electronic financial transactions. The computer system of the card payment network can communicate with a computer system of a card issuer 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the consumer's financial account. Once the electronic financial transaction is complete, the payment system can communicate data describing the card-less payment transaction to the user device, e.g., an electronic receipt, which can, for example, notify the consumer of the total amount billed to the user for the card-less payment transaction with the particular merchant.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more that one network 114 can connect these entities. The payment system, the merchant device, and the user device can communicate over the network using wired or wireless connections, or combinations thereof.

Figure 2:
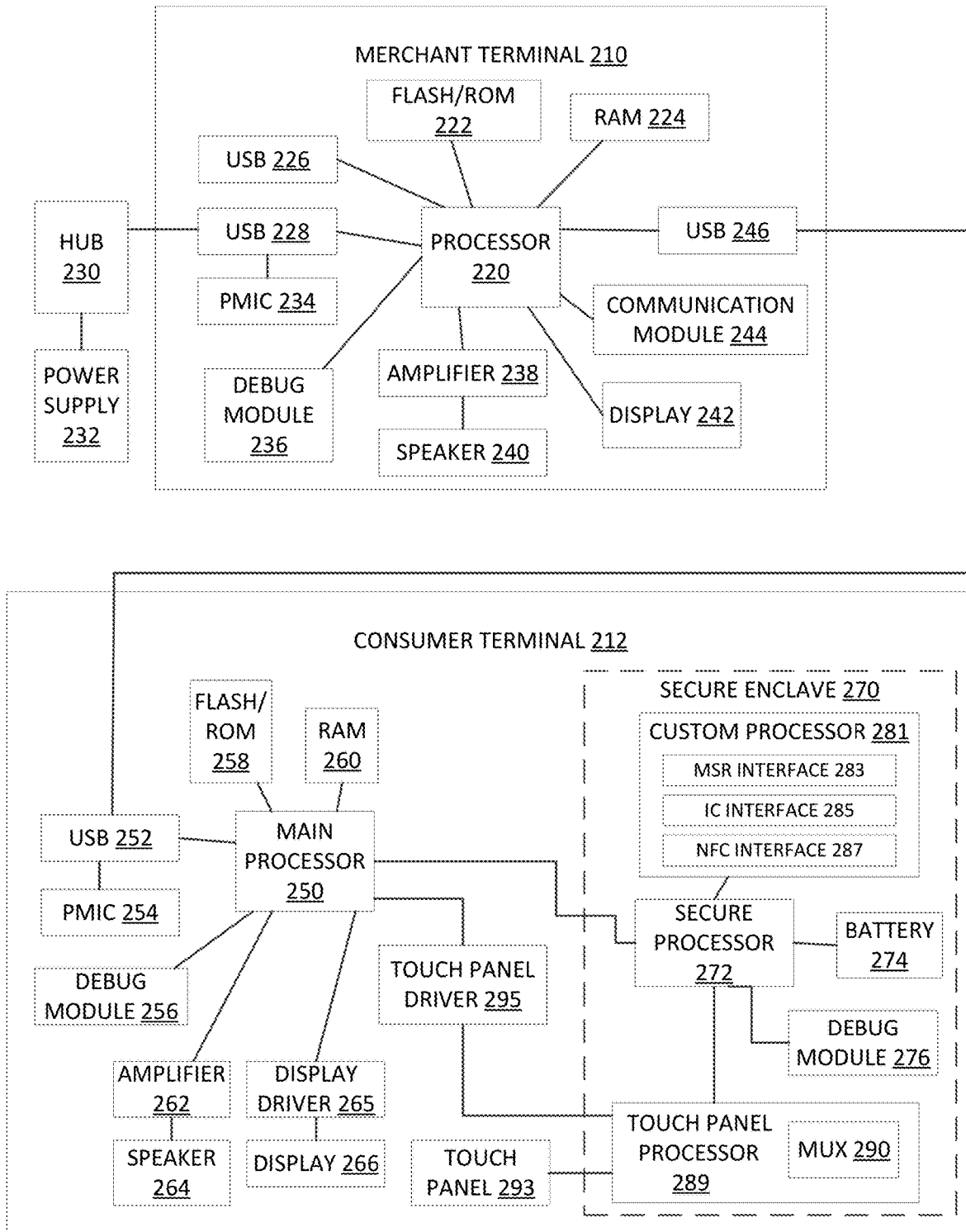
FIG. 2 illustrates an example schematic diagram of components of each terminal in a point-of-sale system for enabling transactions between merchants and buyers.

Reference is now made to FIG. 2 illustrating an example schematic diagram of components of each terminal in the point-of-sale system in accordance with some embodiments of the present technology. The point-of-sale system 200 includes a merchant terminal 210 and a consumer terminal 212. The merchant terminal 210 includes non-transitory computer readable instructions stored in memory 222 that when interpreted by a merchant terminal processor causes the merchant terminal processor to display a series of screens in a display of the merchant facing graphical user interface for guiding a merchant through a point of sale transaction. The consumer terminal 212 includes non-transitory computer readable instructions stored in memory 258 that when interpreted by a non-secure consumer terminal processor causes the non-secure consumer terminal processor to display a series of screens in a consumer facing graphical user interface on the display for guiding the consumer through the point-of-sale transaction.

The merchant terminal 210 includes a SoC (System-on-chip) processor 220 and associated flash memory 222 and RAM 224. A USB-A port 226 is provided for connecting other devices or components to the merchant terminal 210 as appropriate. A USB+Power port 228 is provided connected to a hub 230 for various peripherals associated with a point-of-sale system, including a receipt printer, cash drawer, barcode scanner, scale, keyboard, USB-Ethernet dongle/USB mifi, and other point-of-sale peripheral components known in the art. The hub 230 can be a 5-port USB hub in some embodiments. While both a USB-A port and a USB+Power port are separately identified, such should not be considered limitation. Additionally, although the connectors are shown as being USB, any universal adapter can be implemented to connect other devices to the merchant terminal and to connect the merchant terminal to the consumer terminal. A Power Management Integrated Circuit (PMIC) 234 is in communication with the micro USB connector 228. A PMIC is an integrated circuit for managing power requirements of the host system. Merchant terminal can have any number of USB ports, and the ports can be of any suitable characteristics. A power supply 232 can be provided as power through the hub 230 via connector 228 on the merchant terminal 210. In some embodiments, power can be provided directly to the merchant terminal, for example via USB connector 226. A debug module 236 is provided for appropriate debugging of the merchant terminal 210 and the various components thereof. An audio amplifier 238 is provided and a speaker 240 for providing the appropriate audio for the merchant terminal 210. A display 242 can be connected to the processor 220, for example a 13.3-inch LCD display having a resolution of 1920×1080 IPS 166 PPI. The display 242 provides the interfaces and outputs to the merchant terminal 210 to be viewed by a merchant. A communication module 244 is in communication with the processor 220 to perform the communication for the merchant terminal, for example, with the consumer terminal and other point-of-sale system components, or for example a payment system. The communication module 244 can include one or more interfaces and hardware components for enabling communication with various other devices, such as over the network(s) 114 shown in FIG. 1. For example, communication module 244 can enable communication through one or more of the internet, cable networks, wireless networks (e.g., Wi-Fi), and wired networks, as well as close-range communications, such as Bluetooth®, Bluetooth® Low Energy (BLE), near field communication (NFC) and the like, as additionally enumerated elsewhere herein.

In some embodiments, the communication module 244 can include a cellular communications transceiver for sending and receiving data over a cellular communications network such as via voice call, short messaging service (SMS), multimedia messaging service (MMS), hypertext transfer protocol (HTTP), direct data connection, WTP, e-mail or another suitable type of electronic communication. In some embodiments, the communication module 244 also provides other conventional connections to the network for distribution of files and/or media objects using standard network protocols such as TCP/IP, HTTP, HTTPS and SMTP, etc.

A USB port 246 is provided for detachably connecting the merchant terminal 210 to the consumer terminal 212. The term "detachably" is intended to refer to the ability for the merchant terminal to be connected to the consumer terminal but also configured to being detached from the consumer terminal when desired for storage, upgrades, or other uses. This mating between the terminals can be through direct wired connections shown or wirelessly, in some embodiments.

Other components included in the merchant terminal 210 can include various types of sensors (not shown), which can include a GPS device, an accelerometer, gyroscope, compass, proximity sensor, etc. Additionally, the merchant terminal 210 can include various other components that are not shown, examples of which includes removable storage, an internal power source such as a battery and a power control unit, and so forth.

The consumer terminal 212 includes a SoC processor 250 connected to the micro USB 252 for communication with the merchant terminal 210. A Power Management Integrated Circuit (PMIC) 254 is in communication with the micro USB connector 252. A PMIC is an integrated circuit for managing power requirements of the host system. A debug module 256 is provided for the processor 250 for the appropriate debugging of the consumer terminal 212 and the various components thereof. The processor 250 is coupled to flash memory 258 and RAM 260 for appropriate storage and processing of data. An audio amplifier 262 and speaker 264 are provided for any audio for the consumer on the consumer terminal 212. A display 266 is provided, such as a 7-inch LCD touch-screen display having a resolution of 1280×800 IPS 216 PPI. The display 266 provides interfaces and the outputs of the point-of-sale system to the consumer terminal 212. A display driver 265 controls the display 266.

Memory in the merchant terminal 210 and the consumer terminal 212, including flash/ROM 222, RAM 224, flash/ROM 258 and RAM 260 are examples of non-transitory computer storage media (e.g., computer-readable media) and can include volatile and non-volatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 210 can access external storage, such as RAID storage systems, storage arrays, network attached storage, storage area networks, cloud storage, or any other medium that can be used to store information and that can be accessed by the processor directly or through another computing device or network. Accordingly, the memory 222, 224 or 258, 260 can be computer storage media able to store instructions, modules or components that can be executed by the processor 220 or 250, respectively.

The display 266 of the consumer terminal 212 (and, likewise the display 242 of the merchant terminal 210) can employ any suitable display technology. For example, the display 242 and the display 266 can be a liquid crystal display (LCD), a plasma display, a light emitting diode (LED) display, an OLED (organic light-emitting diode) display, an electronic paper display, or any other suitable type of display able to present digital content thereon. The consumer terminal can include a touch panel 293 associated with the display 266 to provide a touchscreen display configured to receive touch inputs for enabling interaction with a graphical user interface presented on the display. Accordingly, embodiments described herein are not limited to any particular display technology. In some embodiments, the merchant device may not include a display, and information can be presented via the speaker 264.

A secure enclave 270 is included in the consumer terminal 212. The secure enclave includes a secure processor 272 coupled to the main terminal processor 250, an anti-tamper battery 274, and a secure debug module 276. Each processor, including the merchant terminal processor 220, the consumer terminal main processor 250, the secure processor 272, the custom processor 281 and the touch panel processor 289, can each comprise one or more processors or processing cores. For example, the processor(s) 220, 250, 272, 281 and 289 can be implemented as one or more microprocessors, microcomputers, microcontrollers, digital signal processors, central processing units, state machines, logic circuitries, and/or any devices that manipulate signals based on operational instructions. In some embodiments, the processor(s) 220, 250, 272, 281 and 289 can be one or more hardware processors and/or logic circuits of any suitable type specifically programmed or configured to execute the algorithms and processes described herein by performing various input/output, logical, and/or mathematical operations. The processor(s) 220, 250, 272, 281 and 289 can be configured to fetch and execute computer-readable processor-executable instructions stored in the memory 222, 224, 258 and 260.

The secure processor receives inputs from the custom processor 281 equipped with a magnetic stripe interface 283, an integrated circuit interface 285 and a near field communication (NFC) interface 287.

All inputs received by the consumer terminal at the touch panel 293 (for example, as entries into a payment application or a register-buddy application in communication with the merchant terminal), are sent to the touch panel processor 289 having a multiplexer 290 configured to put the consumer terminal into (1) a secure mode when the main processor makes a request to receive secure data, and the data does not exit the secure enclave, and (2) a normal mode when the secure processor determines completion of the secure data entry, where data is passed through to the main processor 250. A multiplexer 290 receives inputs from a touch panel 293 and directs inputs to the main processor when in the normal mode, via the touch panel driver in a pass-through mode, and directs inputs received in the touch panel to the secure processor when in the secure mode. In some embodiments, the main processor on the merchant terminal and the consumer terminal will each run their own operating system (including possibly two different copies of the same operating system, different versions of the same operating system, or different operating systems altogether, etc.).

Reference is now made to FIGS. 3A-8, showing example diagrams according to some embodiments of a tamper-proof computing device.

FIG. 3A illustrates an example diagram of a tamper-proof computing device having a tamper line embedded in the ITO layer. In some embodiments, the tamper line may be deposited on the ITO layer as a separate layer. The tamper-proof computing device 310 has four sides, including a first side 312, an opposing second side 314, a top side 316 and a bottom side 318. An ITO layer is deposited on an external surface of the computing device 310. The ITO layer has a plurality of capacitive traces embedded in the ITO layer. In this embodiment, the traces 320, 322, 324, 326 run parallel to tamper line 330.

In some embodiments, an existing capacitive trace can be used instead of, or in addition to, a tamper line embedded in the ITO layer, to provide the tamper proofing of the device.

The tamper line 330 is deposited within the ITO layer having the capacitive traces 320, 322, 324 and 326. The tamper line 330 detects an unauthorized physical manipulation of one of the ITO layer or the display itself. The tamper line 330 is positioned in a central position, substantially half-way between the first side 312 and the second side 314 to provide for the protection in a central portion of the computing device 310. The placement and number of tamper lines is variable depending upon the computing device, the arrangement of internal components of the computing device, etc.

FIG. 3B illustrates an example diagram of a tamper-proof computing device having a mesh of tamper line traces proximate the ITO layer to provide a robust protection of move of the computing device 340 than is afforded with a single tamper line 330 of device 310 shown in FIG. 3A. Returning to FIG. 3B, the tamper-proof computing device 340 has a mesh of tamper line traces, including a plurality of tamper line traces that run longitudinally from the top side 316 to the bottom side 318, for example vertical traces 341, 342. The longitudinal traces, for examples tamper line traces 341, 342 run parallel to the longitudinal capacitive traces 343, 344, shown by dashed-line. The tamper-proof computing device 340 also includes a plurality of tamper line traces that run latitudinally from the first side 312 to the opposing second side 314, for example horizontal traces 345, 346. The latitudinal tamper line traces 345, 346 run parallel to the latitudinal capacitive traces 347, 348. Accordingly, a first plane of tamper line traces 341, 342 and capacitive traces 343, 344 can be disposed in a first layer above or below a second plane of tamper line traces 345, 346 and capacitive traces 347, 348 in a second layer. The mesh of tamper line traces of the tamper-proof computing device 340 can provide a more reliable assurance that any unauthorized physical manipulation of the computing device will be detected by the microcontroller coupled to the tamper line(s). In this embodiment, the mesh of tamper line traces includes three vertical traces and four horizontal tamper line traces embedded in the ITO layer. The number and positioning is variable depending upon the computing device, the arrangement of internal components of the computing device, etc.

Figure 3D:
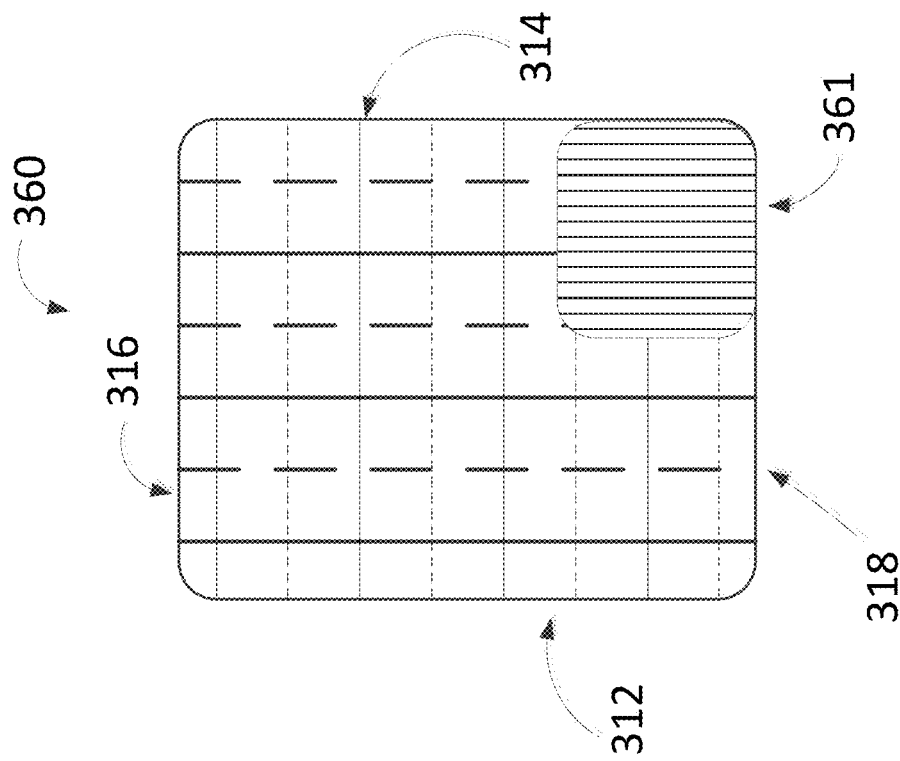
FIG. 3D illustrates an example diagram of a tamper-proof computing device having a mesh of tamper line traces proximate the ITO layer and a cluster of tamper line traces proximate a secure area of internal components of the computing device.
Figure 3C:
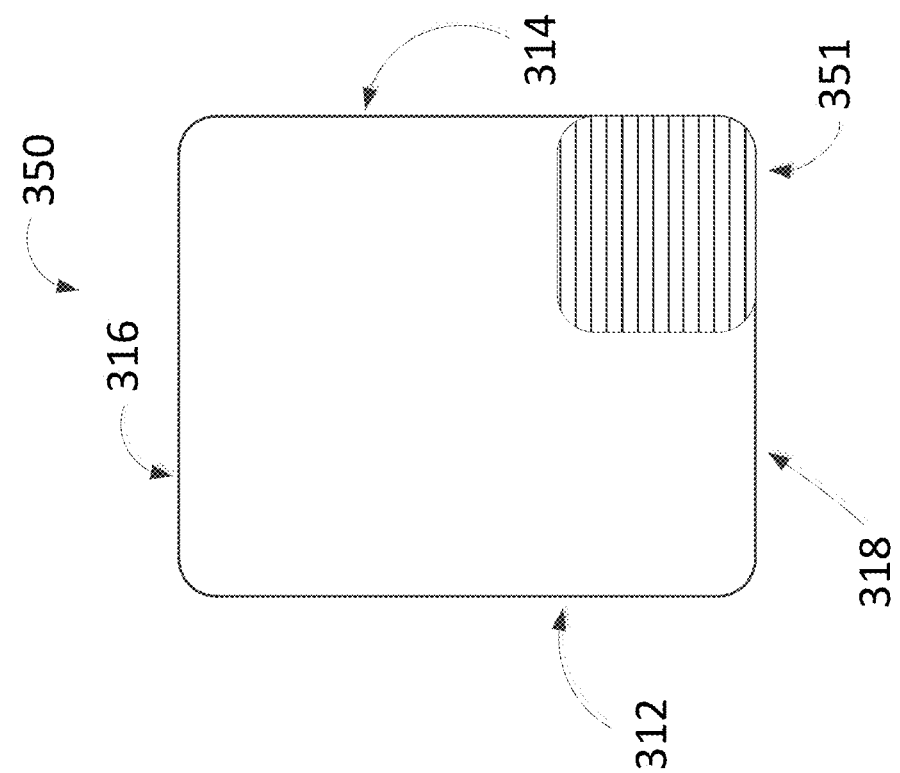
FIG. 3C illustrates an example diagram of a tamper-proof computing device having a cluster of tamper line traces proximate a secure area of internal components of the computing device.

FIG. 3C illustrates an example diagram of a tamper-proof computing device 350 having a cluster 351 of tamper line traces proximate a secure area of internal components of the computing device 350. In some embodiments, it can be desirable to protect a secure area of the computing device, rather than the entire device. For example, a secure area of internal components of the computing device may include a secure processor and other hardware for handling secure data, or where encrypted or otherwise encoded data is stored, such as payment data for payment objects received and processed at the computing device. The tamper-proof computing device 350 has a cluster 351 of tamper line traces protecting a secure area underlying the cluster 351. In some embodiments, the cluster 351 can comprise a plurality of closely-spaced tamper traces, including a plurality of horizontally extending traces. The cluster 351 of tamper line traces protects the secure area located beneath the cluster 351 from unauthorized access.

FIG. 3D illustrates an example diagram of a tamper-proof computing device having a mesh of tamper line traces proximate the ITO layer and a cluster of tamper line traces proximate a secure area of internal components of the computing device. In some embodiments, the computing device can be tamper proofed by a mesh of tamper lines configured to protect the overall computing device, and an additional cluster 361 of tamper traces configured to protect an underlying secure area. The cluster 361 in this embodiment includes a plurality of vertically extending tamper traces.

Figure 4:
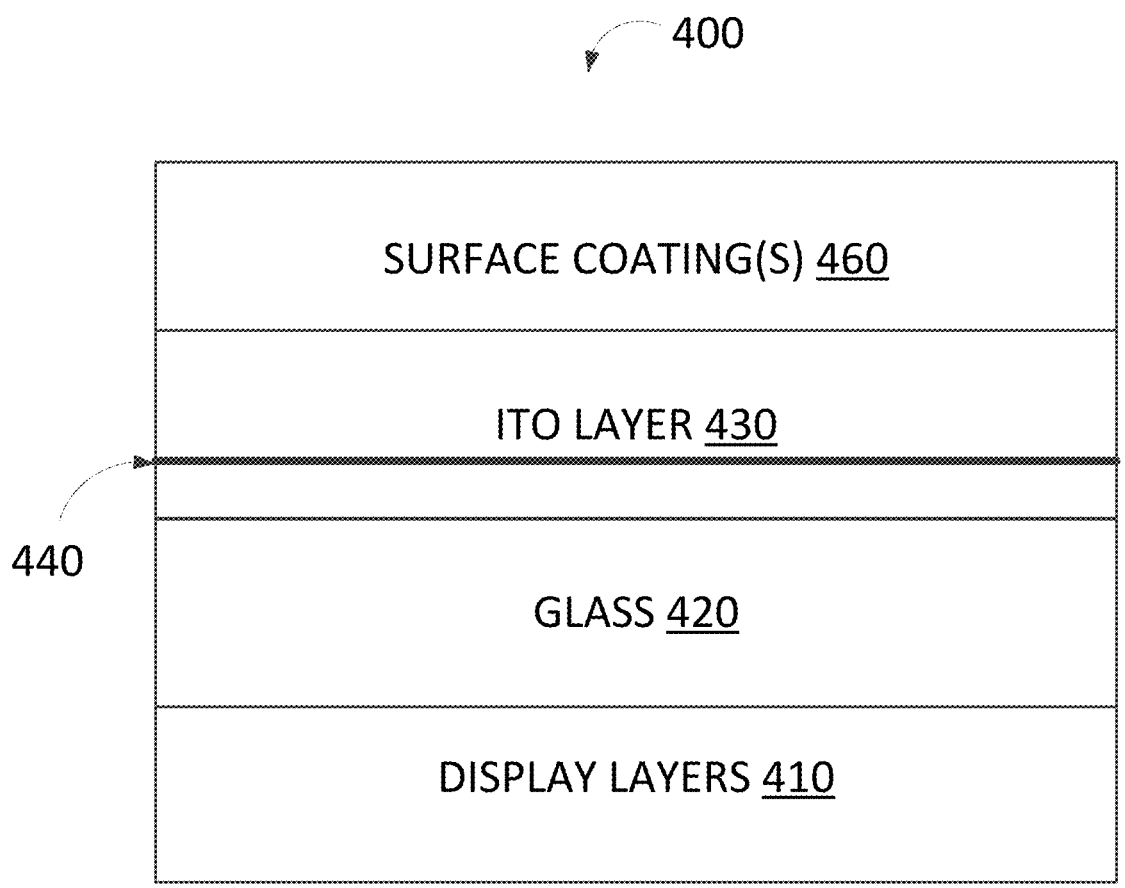
FIG. 4 illustrates an example side view showing the layers of the tamper-proof computing device.

FIG. 4 illustrates an example side view of a tamper-proof computing device showing the layers of the tamper-proof computing device. The tamper-proof computing device 400 includes display layers 410, which are the layers of a display device, and can be a touch-screen display, an LCD display, or other display configured to present a graphical user interface. A glass substrate 420 is deposited on the display layers 410. An ITO layer(s) 430 having a tamper line 440 embedded therein is deposited on the glass substrate 420. The ITO layer(s) 430 also has capacitive traces, that can extend parallel to, perpendicular to, or diagonal to, the tamper line 440 in a same layer as the tamper line. In some embodiments, the tamper line can reside in an ITO layer separate from the ITO layer containing capacitive traces. In some embodiments, one or more surface coating(s) 460 are deposited on an outermost layer of the device, such as an anti-reflective thin film layer, a hard top coating, etc.

In some embodiments, the tamper line can be deposited on the ITO layer as another film layer, rather than embedded in the ITO layer. The tamper line would thus be in communication with underlying microcontroller so the microcontroller can detect an unauthorized physical manipulation of the tamper line.

Figure 5:
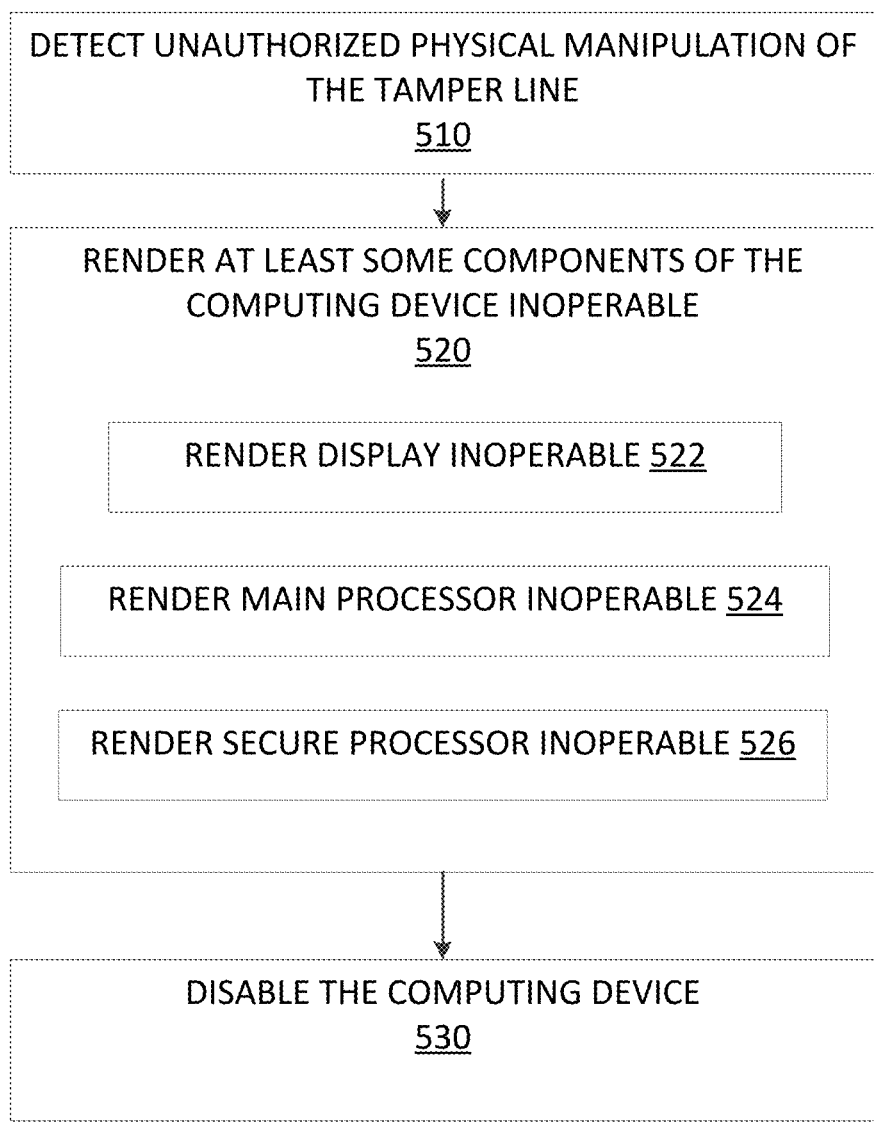
FIG. 5 illustrates an example flow chart of a procedure for detecting a tamper of the tamper-proof computing device.

FIG. 5 illustrates an example flow chart of a procedure for detecting a tamper of a tamper-proof computing device having a tamper line. At 510, an unauthorized physical manipulation of the tamper line is detected. At 520, the microcontroller renders at least some components of the computing device inoperable. At 522, the display of the device can be rendered inoperable, such that the display cannot be driven by another processor or microcontroller. At 524, the main processor can be rendered inoperable, such that the main processor cannot be used to fraudulently drive another display. At 526, the secure processor of the computing device can be rendered inoperable such that the secure data cannot be accessed, nor can the secure processor be used to drive other components. The display, main processor and secure processor can be disabled individually, or can all be disabled, or it is possible for only one of these to be disabled, depending upon the particular computing device. At 530, the microcontroller can disable every single component of the computing device upon detecting an unauthorized physical manipulation of the tamper line. In this manner, the entire device is protected, as data is not accessible, and the components cannot be used to drive other components or devices.

Figure 6:
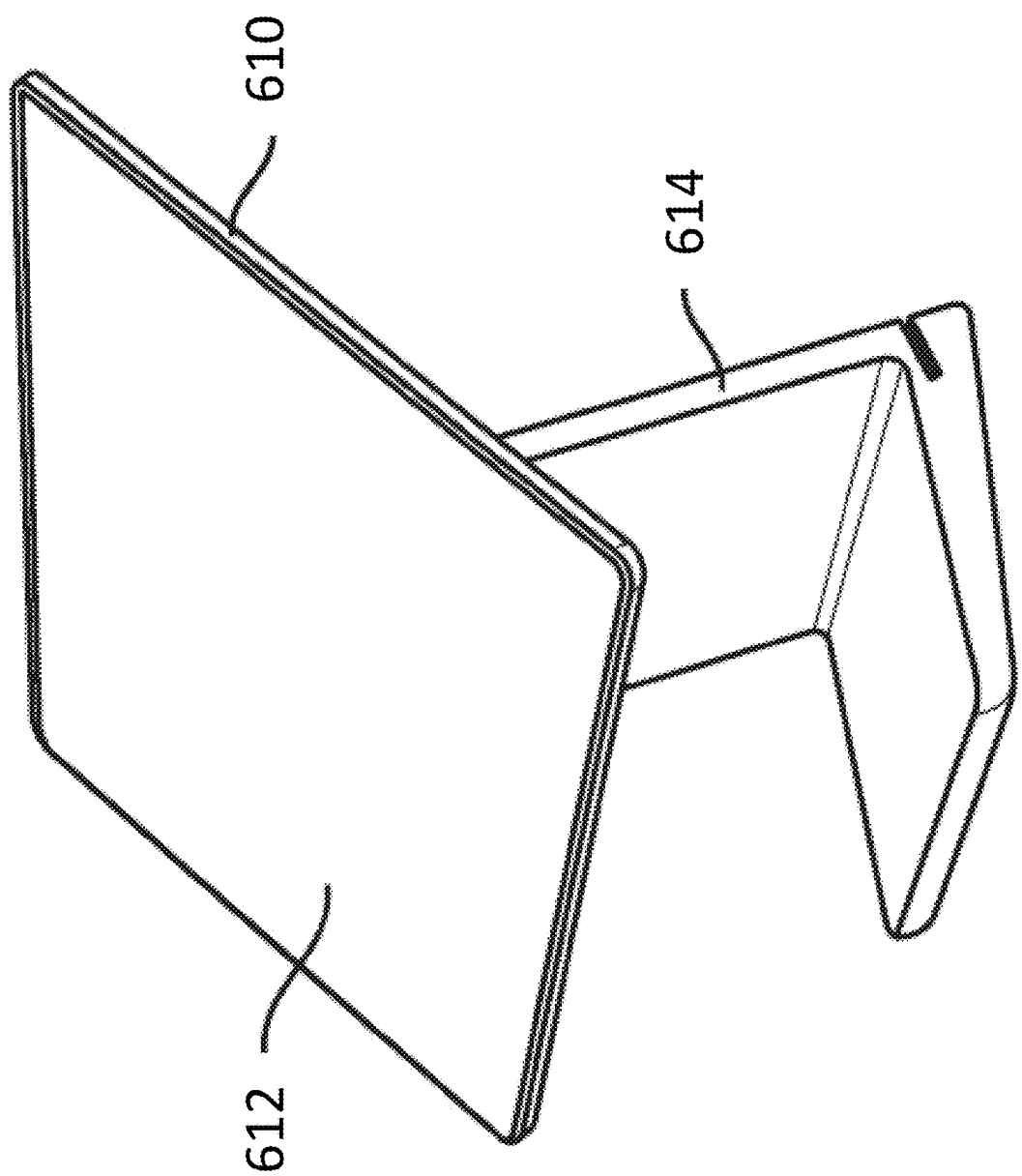
FIG. 6 illustrates an example point-of-sale system as viewed from a front perspective view, including a first terminal and a second terminal that are detachably mated together and shown in a fixed position, in accordance with an embodiment.
Figure 7:
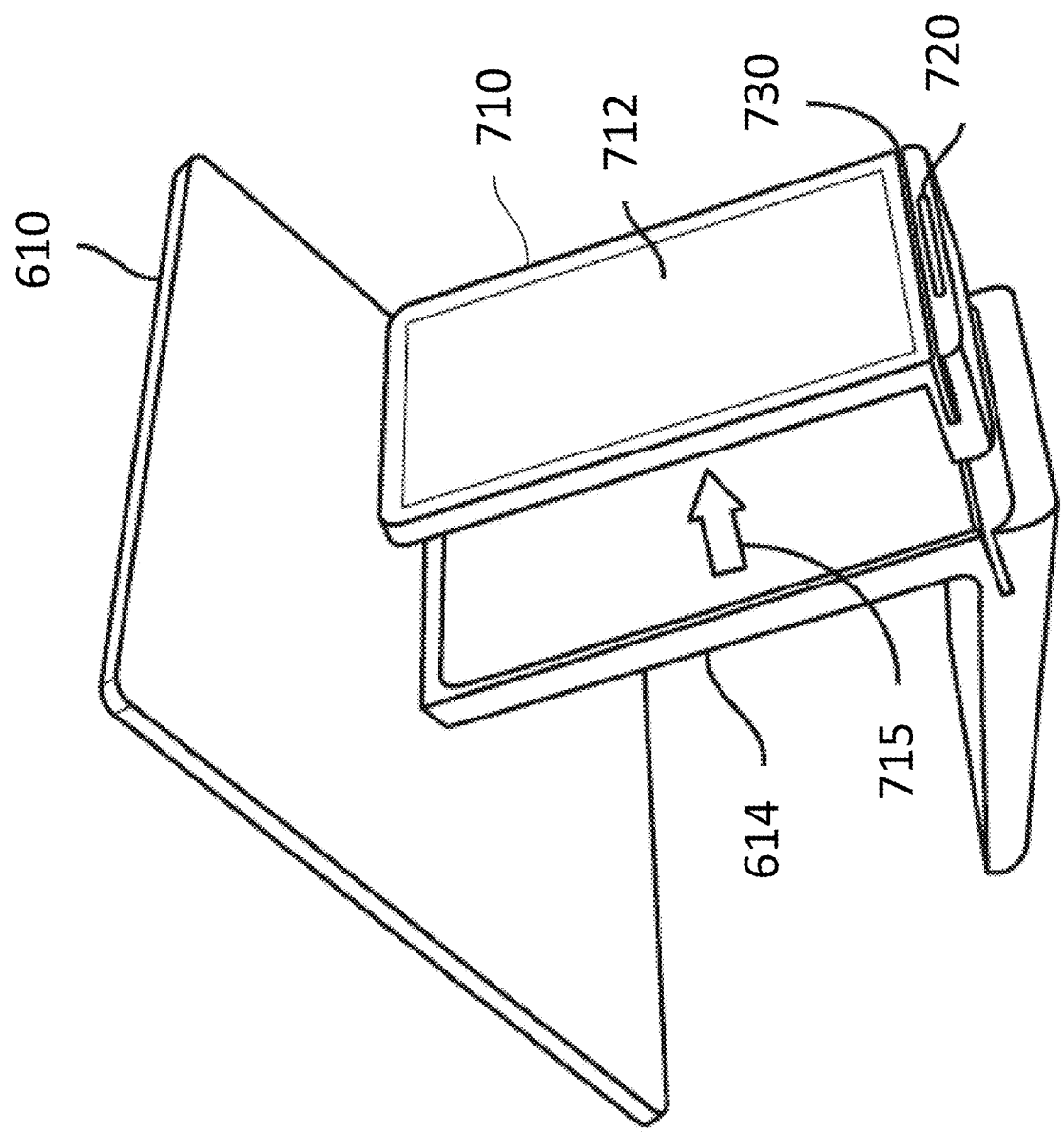
FIG. 7 illustrates the example point-of-sale system of FIG. 9 as viewed from a back perspective view, and showing the second terminal being separated from the first terminal, in accordance with an embodiment.

FIGS. 6-7 illustrate an example point-of-sale system 600. FIG. 6 illustrates an example point-of-sale system 800 as viewed from a front perspective view, including a first terminal and a second terminal that are detachably mated together and shown in a fixed position, in accordance with an embodiment. The first terminal 610 can comprise, for example, a terminal similar to the merchant terminal 210 of FIG. 2. The point-of-sale system 600 includes a first terminal 610 configured, for example, to be a merchant terminal in a merchant-facing direction. The first terminal 610 includes a first computing device 612 and a base 614 into which the second terminal is detachably received. The first computing device 612 can be a separate device that is inserted into the terminal or formed integral into the terminal as a single, unitary structure.

The tamper proofing techniques shown and described herein can be applied to the first computing device 612. For example, in some embodiments, the ITO layer of the computing device 612 can have a tamper line embedded therein or deposited therein. Accordingly, the tamper proofing techniques can be applied to a point-of-sale system that performs a point-of-sale transaction such that any secure information cannot be accessed. Additionally, the tamper proofing techniques render some or all device components inoperable if authentication is not properly established and/or if a component is prohibited from communicating with another component. This can, for example, prevent an unauthorized party from being able to display using a different processor, and it prevents a processor from driving an unauthorized display.

FIG. 7 illustrates the example point-of-sale system of FIG. 6 as viewed from a back perspective view, in accordance with some embodiments, and showing the second terminal 710 being separated with ease from the first terminal 610, as shown by arrow 715. The second terminal 710 is detachably received in the base 614 of the first terminal 610. The second terminal 710 can comprise, for example, a terminal similar to the consumer terminal 212 of FIG. 2. The second terminal 710 includes a second computing device 712. The second computing device 712 can be a separate device that is inserted into the terminal 710 or formed integral into the terminal as a single, unitary structure. The second terminal 710 can include a first "dip slot" card reader 720 configured to read integrated circuit (IC) chip-type cards and a second "swipe slot" card reader 730 configured to read magnetic swipe-type cards. The term "dip slot" refers to a slot or other opening configured to receive or otherwise read a chip-type card via contact or contact-less EMV or NFC communication. The term "swipe slot" refers to a slot or other opening configured to receive a magnetic swipe-type card. In some embodiments, the card reader 720 and the card reader 730 can be replaced with a single hybrid card reader configured to accept both chip-type card and magnetic stripe-type cards. The second terminal 710 can also include an NFC interface within the internal components of the second terminal 710 to participate in NFC payment transactions. For example, the NFC interface could be similar to NFC interface 287 in FIG. 2.

Each terminal can be physically independent of the other and arranged in a separated position, or mated together as shown in FIG. 6. When separated, the first terminal and the second terminal are in communication with each other or otherwise mated together via wired or wireless communication. The thin wedge shape of the second terminal 710 welcomes customers to pick up and hold the second terminal 710 for usage of the terminal.

The tamper proofing techniques shown and described herein can likewise be applied to the second computing device 712. For example, the ITO layer of the computing device 712 can have a tamper line embedded therein or deposited therein.

Figure 8:
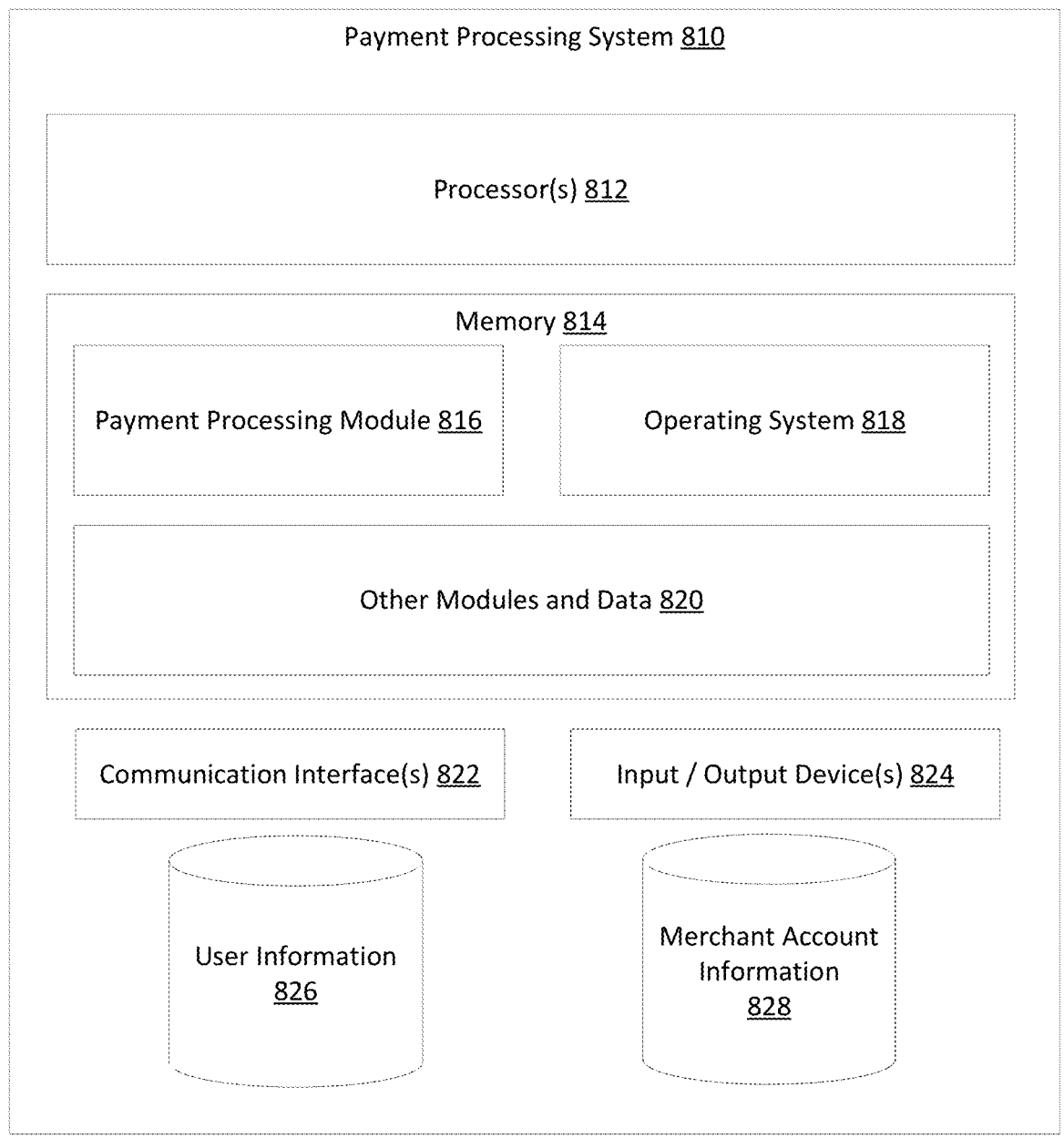
FIG. 8 illustrates an example block diagram of components of a payment processing system.

FIG. 8 is a block diagram illustrating select components of an example payment processing system 810 according to some embodiments. The payment processing system 810 can comprise the payment processing system 102 in an example embodiment. The payment processing system 810 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

The payment processing system 810 enables a service provider to provide a payment service in which merchants are able to conduct POS transactions with a plurality of buyers, such as for selling services and/or products to the buyers. The payment processing system 810 can include one or more processor(s) 812 (or servers) that are configured to process secure electronic financial transactions, e.g., payment during a POS transaction, by communicating with the merchant device, card payment networks, and bank or other financial institution payment systems. The payment processing system 810 includes a payment processing module 816 that receives transaction information for processing payments made through the merchant application. For example, the payment processing module 816 can receive transaction information, such as an amount of the transaction, and can verify that a particular payment card can be used to pay for the transaction, such as by contacting a card clearinghouse of a card payment network. Furthermore, in some examples, the payment processing module 816 can redirect payment information for transactions to be made using payment cards to a bank, or other financial institution, payment system. In other embodiments, the merchant device can communicate directly with an appropriate card payment network or bank payment system for approving or denying a transaction using a particular payment card for a POS transaction.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

As introduced above, the payment processing system 810 can be configured to communicate with one or more systems of a card payment network (e.g., MasterCard®, VISA®, or the like) over the network to conduct financial transactions electronically. The payment processing system 810 can also communicate with one or more bank payment systems of one or more banks over the network. For example, the payment processing system 810 can communicate with an acquiring bank, a payment card issuing bank, and/or a bank maintaining buyer accounts for electronic payments.

A payment card acquiring bank can be a registered member of a card association (e.g., Visa®, MasterCard®, or the like), and can be part of a card payment network A payment card issuing bank can issue payment cards to buyers, and can pay acquiring banks for purchases made by cardholders to which the issuing bank has issued a payment card. Accordingly, in some embodiments, the systems of an acquiring bank can be included in the card payment network and can communicate with systems of a payment card issuing bank to obtain payment. Further, in some embodiments, bank payment systems can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

Further, while the examples herein illustrate the components and data of the payment processing system 810 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 810. Multiple payment processing systems 810 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 8, the payment processing system 810 includes one or more processors 812, one or more memory devices 814, one or more communication interfaces 822, and one or more input/output devices 824. These components can be similar to those described above with reference to FIG. 1 and elsewhere herein.

The memory 814 can be used to store and maintain any number of functional components or modules that are executable by the processor 812. In some embodiments, these functional components comprise instructions or programs that are executable by the processor 812 and that, when executed; implement operational logic for performing the actions and services attributed above to the payment processing system 810. Functional components of the payment processing system 810 stored in the memory 814 can include the payment processing module 816, the operating system 818, and other modules and data 820. These components can be similar to those described with reference to FIG. 1 and elsewhere herein. In addition, the memory 814 can store data used for performing the operations described herein. Thus, the memory 814 can store merchant information 826, including the merchant profiles. Further, the payment processing system 810 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A tamper-proof computing device used in conducting a point-of-sale transaction comprising:
    a touch-screen display having an external surface, the touch-screen display being configured to display a graphical user interface;
    an indium-tin-oxide (ITO) layer deposited on the external surface of the touch-screen display having a plurality of capacitive traces deposited in the ITO layer, the capacitive traces, being configured to detect a change in capacitance caused by contact with a finger on the external surface of the touch-screen display;
    a security microcontroller arranged as an internal component of the tamper-proof computing device; and
    a tamper line embedded in the ITO layer, the tamper line coupled to the security microcontroller, the tamper line arranged so that it is susceptible to breaking upon unauthorized physical manipulation of one of the ITO layer or the touch-screen display, which the security microcontroller is configured to detect, and to render at least one component of the tamper-proof computing device inoperable.

2. The tamper-proof computing device of claim 1 wherein the security microcontroller is further configured to disable the touch-screen display upon detecting the unauthorized physical manipulation, such that the touch-screen display cannot be driven by another processor or another microcontroller.

3. The tamper-proof computing device of claim 1 further comprising one or more thin film layers deposited between the ITO layer and the touch-screen display.

4. The tamper-proof computing device of claim 1 wherein the tamper line comprises a cluster of traces embedded in the ITO layer over a secure area of internal components of the tamper-proof computing device.

5. The tamper-proof computing device of claim 1 wherein the tamper line is embedded proximate a center of the ITO layer.

6. The tamper-proof computing device of claim 1 wherein the tamper line comprises a first plurality of traces arranged in a longitudinal direction from a first side of the computing device to an opposing second side of the computing device and a second plurality of traces arranged in a latitudinal direction from a third side of the computing device to an opposing fourth side of the computing device.

7. A tamper-proof computing device used in conducting a point-of-sale transaction comprising:
    a display having an external surface, the display being configured to display a graphical user interface;
    an indium-tin-oxide (ITO) layer deposited on the external surface of the display, the ITO layer having a plurality of capacitive traces deposited in the ITO layer, the capacitive traces being configured to detect a change in capacitance caused by contact with a finger on the ITO layer;
    a security microcontroller arranged as an internal component of the tamper-proof computing device; and
    a tamper line deposited in the ITO layer, the tamper line coupled to the security microcontroller, the tamper line arranged so that it is susceptible to breaking upon unauthorized physical manipulation of one of the ITO layer or the display, which the security microcontroller is configured to detect, and to render at least one component of the tamper-proof computing device inoperable.

8. The tamper-proof computing device of claim 7 wherein the tamper line comprises a cluster of traces embedded in the ITO layer over a secure area of internal components of the tamper-proof computing device.

9. The tamper-proof computing device of claim 7 wherein the tamper line comprises a first plurality of traces arranged in a longitudinal direction from a first side of the computing device to an opposing second side of the computing device and a second plurality of traces arranged in a latitudinal direction from a third side of the computing device to an opposing fourth side of the computing device.

10. The tamper-proof computing device of claim 7 wherein the tamper line is deposited on the ITO layer as another layer.

11. The tamper-proof computing device of claim 7 wherein the tamper line is embedded within the ITO layer.

12. A method of manufacturing a tamper-proof computing device, comprising:
    forming a tamper line in an ITO layer;
    depositing the ITO layer on an external surface of a display of the tamper-proof computing device;
    coupling the tamper line to a security microcontroller, the security microcontroller being one of a plurality of internal components of the tamper-proof computing device; and
    configuring the security microcontroller to detect an unauthorized physical manipulation of one of the ITO layer or the display and to render at least some of the plurality of internal components of the computing device inoperable upon detecting the unauthorized physical manipulation.

13. The method of claim 12 wherein forming a tamper line communicatively coupled to a plurality of capacitive traces in an ITO layer comprises:
    embedding the tamper line within the ITO layer.

14. The method of claim 12 wherein forming a tamper line communicatively coupled to a plurality of capacitive traces in an ITO layer comprises:
    depositing the tamper line on the ITO layer.

15. The method of claim 12 wherein forming the tamper line comprises:
    embedding a cluster of tamper traces within the ITO layer, proximate the security microcontroller.

16. The method of claim 12 wherein forming the tamper line the tamper line comprises:

embedding a mesh of tamper traces having a first plurality of traces arranged in a longitudinal direction from a first side of the computing device to an opposing second side of the computing device and a second plurality of traces arranged in a latitudinal direction from a third side of the computing device to an opposing fourth side of the computing device.

17. A method of detecting a tampering of a computing device, the method comprising:

detecting, by a security microcontroller, an unauthorized physical manipulation of a tamper line coupled to the security microcontroller, the security microcontroller arranged as an internal component of the computing device, the tamper line embedded in an ITO layer deposited on an external surface of a touch-screen display of the tamper-proof computing device, the tamper line including at least one tamper trace communicatively coupled to a capacitive trace in the ITO layer, the tamper line arranged so that it is susceptible to breaking upon unauthorized physical manipulation of one of the ITO layer or the touch-screen display; and rendering the touch-screen display inoperable.

18. The method of claim 17 further comprising:
rendering the security microcontroller inoperable.

19. The method of claim 17 further comprising:
rendering a main processor of the tamper-proof computing device inoperable.

20. The method of claim 17 further comprising:
rendering a secure area of the tamper-proof computing device inoperable, the secure area including the security microcontroller.

\* \* \* \* \*